US012234956B1

(12) United States Patent
Yang

(10) Patent No.: US 12,234,956 B1
(45) Date of Patent: Feb. 25, 2025

(54) FULL-SPECTRUM DECORATIVE STRING LIGHT

(71) Applicant: Chen Sheng Yang, Kaohsiung (TW)

(72) Inventor: Chen Sheng Yang, Kaohsiung (TW)

( * ) Notice: Subject to any disclaimer, the term of this patent is extended or adjusted under 35 U.S.C. 154(b) by 0 days.

(21) Appl. No.: 18/670,186

(22) Filed: May 21, 2024

(51) Int. Cl.
*F21S 4/10* (2016.01)
*F21S 10/02* (2006.01)
*H05B 45/20* (2020.01)
*H05B 45/325* (2020.01)

(52) U.S. Cl.
CPC ............... *F21S 4/10* (2016.01); *F21S 10/023* (2013.01); *H05B 45/20* (2020.01); *H05B 45/325* (2020.01)

(58) Field of Classification Search
CPC .......... F21S 4/10; F21S 10/023; H05B 45/20; H05B 45/325
See application file for complete search history.

(56) References Cited

U.S. PATENT DOCUMENTS

| | | | | |
|---|---|---|---|---|
| 2012/0086349 | A1* | 4/2012 | Segan | H05B 45/31 315/193 |
| 2017/0150560 | A1* | 5/2017 | Janning | H05B 45/42 |

* cited by examiner

*Primary Examiner* — Anne M Hines
(74) *Attorney, Agent, or Firm* — FisherBroyles, LLP; Roger L. Browdy; Ronni S. Jillions

(57) ABSTRACT

A full-spectrum decorative string light has a light emitting diode (LED) light string and a control circuit. The LED light string includes multiple light units. Each one of the light units has a first LED and a second LED. The first LED is electrically connected to the second LED in parallel by inverse direction. Each one of the first LED and the second LED is selected from the group consisting of a yellow LED and a white LED. The first LED and the second LED have different colors. The control circuit is electrically connected to the LED light string to activate the LED light string by pulse width modulation (PWM) control signals. The duty cycles of the PWM control signals are changeable.

9 Claims, 7 Drawing Sheets

FULL-SPECTRUM DECORATIVE STRING LIGHT

BACKGROUND OF THE INVENTION

1. Field of the Invention

The present invention generally relates to a string light, and more particularly to a full-spectrum decorative string light.

2. Description of Related Art

String lights are widely used in Christmas decoration. For example, Christmas trees, interior/exterior spaces, and house eaves can be decorated by the string lights. At night, the string lights will be turned on to create Christmas atmosphere. A conventional Christmas string light includes a light emitting diode (LED) light string and a control circuit. The LED light string basically has multiple LEDs that are electrically connected in series. The control circuit is electrically connected to the LED light string to turn on the LED light string or further change its lighting modes, such as normal-on, quick twinkle, and slow twinkle.

However, each LED in the conventional Christmas string light is a single-color LED with limited spectrum. As a result, the Christmas atmosphere created by the conventional Christmas string light anywhere looks almost the same and monotonous. Therefore, how to make a Christmas string light different from the conventional one is an issue to be overcome at present.

SUMMARY OF THE INVENTION

An objective of the present invention is to provide a full-spectrum decorative string light to overcome the foregoing defects of the conventional Christmas string light.

The full-spectrum decorative string light of the present invention comprises a light emitting diode (LED) light string and a control circuit. The LED light string includes multiple light units. Each one of the light units has a first LED and a second LED. The first LED is electrically connected to the second LED in parallel by inverse direction. Each one of the first LED and the second LED is selected from the group consisting of a yellow LED and a white LED. The first LED and the second LED have different colors. The control circuit is electrically connected to the LED light string to activate the LED light string by pulse width modulation (PWM) control signals. The duty cycles of the PWM control signals are changeable.

The full-spectrum decorative string light of the present invention can be used for Christmas decoration as an example. Each one of the light units includes both the yellow LED and the white LED to have the full-spectrum, rather than the single-color LED with limited spectrum in the conventional Christmas string light. Besides, the control circuit activates the LED light string by PWM control signals any may create a dimmable color temperature based on the changeable duty cycles of the PWM control signals. Therefore, the Christmas atmosphere created by the full-spectrum decorative string light of the present invention will be more remarkable than the conventional Christmas string light.

DETAILED DESCRIPTION OF PREFERRED EMBODIMENT(S)

An embodiment of the full-spectrum decorative string light of the present invention comprises a light emitting diode (LED) light string and a control circuit. In principle, the control circuit uses pulse width modulation (PWM) technique to activate yellow light emitting diodes (LEDs) and white LEDs to establish the full-spectrum whose color temperature is dimmable between 2400K and 6500K (including 2400K and 6500K).

Figure 1:
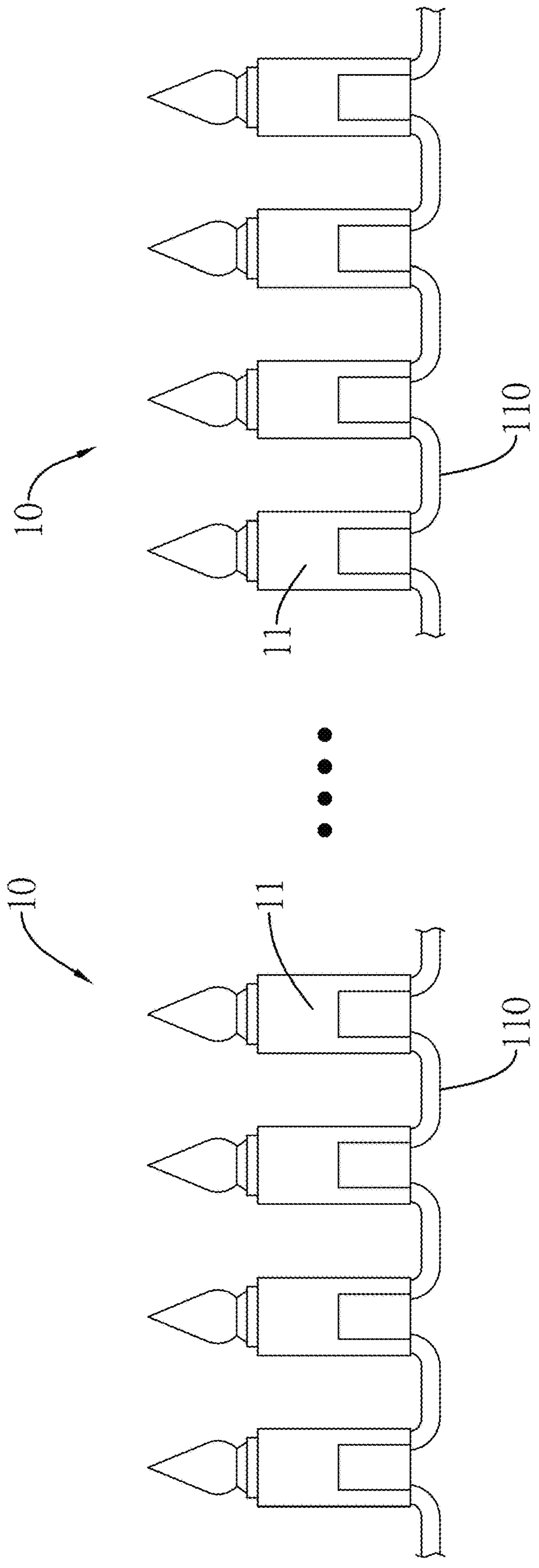
FIG. 1 is a schematic view showing an embodiment of the LED light string of the full-spectrum decorative string light of the present invention.

With reference to FIG. 1, the LED light string 10 includes multiple light units 11 connected in series. For example, each light unit 11 may be a single LED bulb. The LED bulbs are connected in series via wires 110.

Figure 2A:
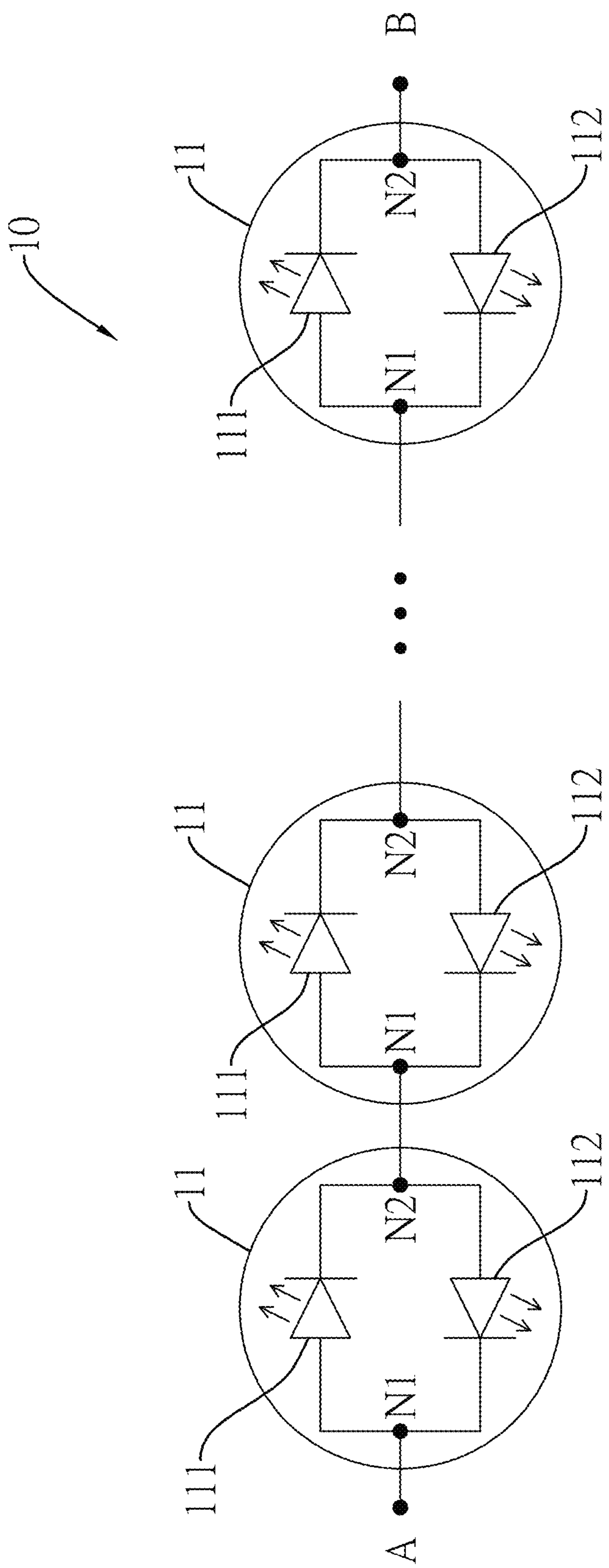
FIG. 2A is a schematic circuit diagram showing an embodiment of the LED light string of the full-spectrum decorative string light of the present invention.

FIG. 2A depicts the circuit diagram of a first embodiment of the LED light string 10. Each one of the light units 11 has a first LED 111 and a second LED 112. In each light unit 11, the first LED 111 is electrically connected to the second LED 112 in parallel by inverse direction. In more detail, as shown in FIG. 2A, an anode of the first LED 111 is electrically connected to a cathode of the second LED 112, and a cathode of the first LED 111 is electrically connected to an anode of the second LED 112. Besides, there are two connection nodes formed in each light unit 11. One of the connection nodes (hereinafter referred to as a first node N1) is between the anode of the first LED 111 and the cathode of the second LED 112. The other connection node (hereinafter referred to as a second node N2) is between the cathode of the first LED 111 and the anode of the second LED 112. In the embodiment of FIG. 2A, for any two adjacent light units 11, the second node N2 of one light unit 11 is electrically connected to the first node N1 of the other light unit 11 to form a series connection. Therefore, via the foregoing connection nodes, the first LEDs 111 in the LED light string 10 are electrically connected in series, and the second LEDs 112 in the LED light string 10 are electrically connected in series. The first LEDs 111 are electrically connected to the second LEDs 112 by inverse direction.

In each light unit 11, each one of the first LEDs 111 and the second LEDs 112 is selected from the group consisting of a yellow LED and a white LED. The specification of the yellow LED includes 2400K color temperature, such that the yellow LED may emit light of 2400K color temperature when turned on. The specification of the white LED includes 6500K color temperature, such that the white LED may emit light of 6500K color temperature when turned on. In each light unit 11, the first LED 111 and the second LED 112 have different light colors. So, in each light unit 11, when the first LED 111 is the yellow LED, the second LED 112 is the white LED; or when the first LED 111 is the white LED, the second LED 112 is the yellow LED.

Figure 2B:
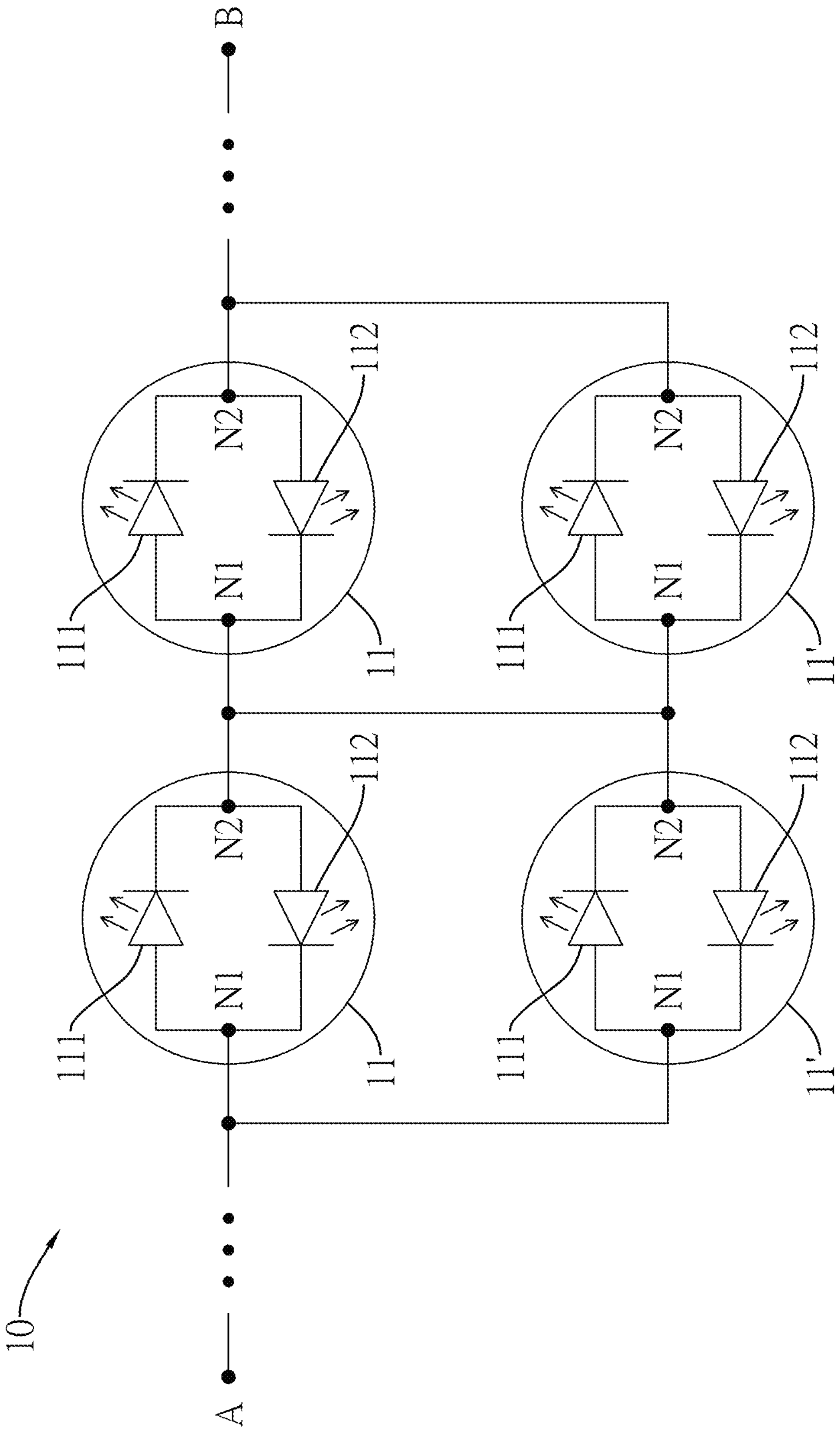
FIG. 2B is a schematic circuit diagram showing another embodiment of the LED light string of the full-spectrum decorative string light of the present invention.

FIG. 2B depicts the circuit diagram of a second embodiment of the LED light string 10. Compared with the first embodiment of FIG. 2A, each light unit 11 in the second embodiment of FIG. 2B is further electrically connected to another light unit 11'. The light unit 11' is additional (not included in the original light units 11). The light units 11,11' have the same circuit configuration and specification for the first LED 111 and the second LED 112. In the second embodiment of FIG. 2B, for any two adjacent light units 11,11', the first node N1 of one light unit 11 is electrically connected to the first node N1 of the other light unit 11', and the second node N2 of one light unit 11 is electrically connected to the second node N2 of the other light unit 11', to form a parallel connection for the two light units 11,11'.

The control circuit of the present invention is electrically connected to the LED light string 10 to activate the LED light string 10 by PWM control signals (as the above-mentioned PWM technique). The duty cycles of the PWM control signals are programmable and changeable. For example, the duty cycles of the PWM control signals are changeable between 100% and 0% (including 100% and 0%).

Figure 3:
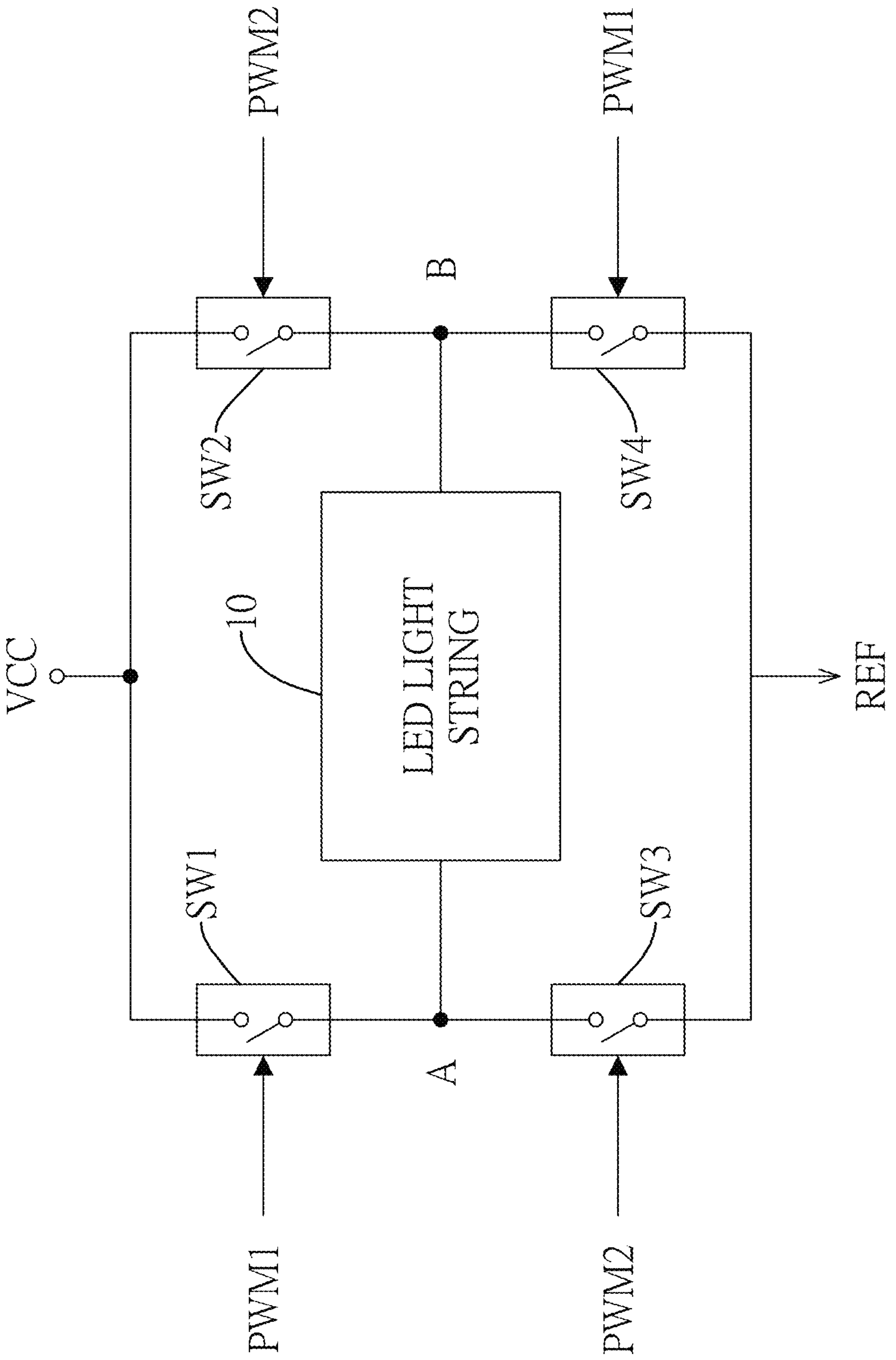
FIG. 3 is a schematic block diagram showing four switches of the control circuit electrically connected to the LED light string of the full-spectrum decorative string light of the present invention.
Figure 4:
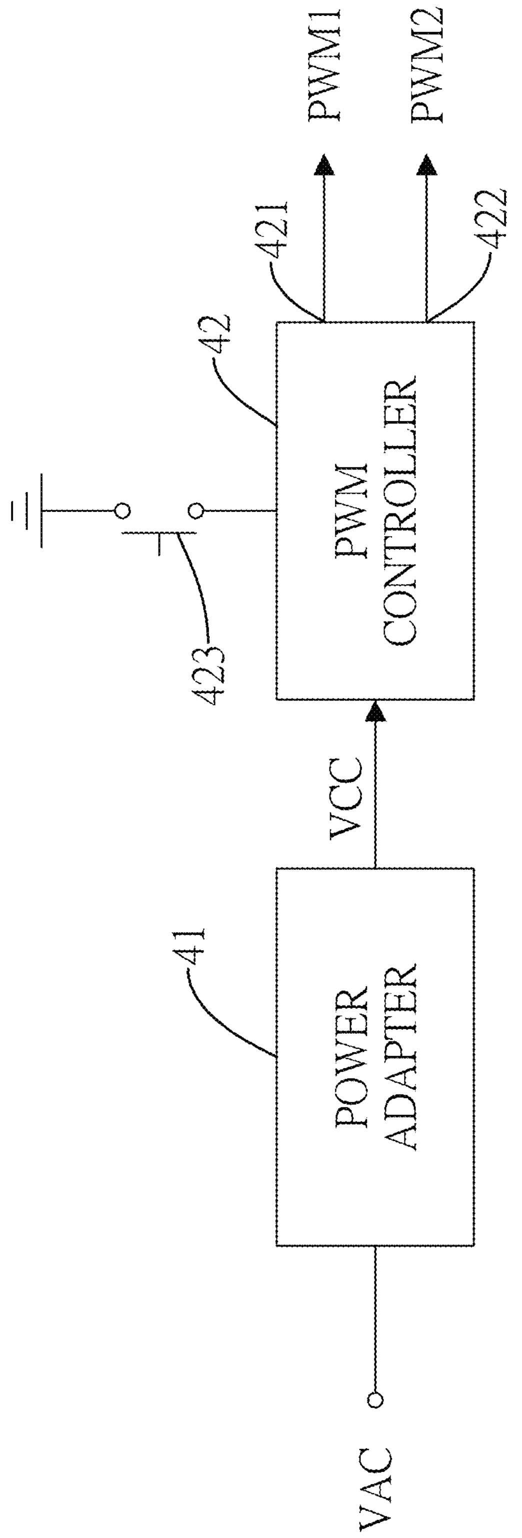
FIG. 4 is a schematic block diagram showing an embodiment of the control circuit of the full-spectrum decorative string light of the present invention.

In more detail, with reference to FIG. 3 and FIG. 4, an embodiment of the control circuit of the present invention includes a power adapter 41, a PWM controller 42, a first switch SW1, a second switch SW2, a third switch SW3, and a fourth switch SW4. Each one of the foregoing switches SW1, SW2, SW3, SW4 may be a transistor (such as MOSFET), a solid state relay, and so on with a control input terminal. The power adapter 41 is configured to provide a working voltage VCC to the PWM controller 42 and the LED light string 10. The LED light string 10 is electrically connected to an output of the power adapter 41 to receive the working voltage VCC via the operation of the foregoing switches SW1, SW2, SW3, SW4 under the PWM technique by the PWM controller 42. For example, with reference to FIG. 2A, FIG. 2B, and FIG. 3, the LED light string 10 has a head node A and a tail node B. The first switch SW1 is electrically connected between the output of the power adapter 41 (to receive VCC) and the head node A of the LED light string 10. The second switch SW2 is electrically connected between the output of the power adapter 41 (to receive VCC) and the tail node B of the LED light string 10. The third switch SW3 is electrically connected to the head node A of the LED light string 10 and a reference potential terminal REF (such as grounding or 0V) of the power adapter 41. The fourth switch SW4 is electrically connected to the tail node B of the LED light string 10 and the reference potential terminal REF of the power adapter 41.

With reference to the LED light string 10 shown in FIG. 2A, because the configuration of the light units 11 is the series connection, the LED light string 10 would have two ends such as a head end and a tail end, and there would be two light units 11 at the two ends of the LED light string 10 respectively. The first node N1 of the light unit 11 at the head end of the LED light string 10 is defined as the head node A. The second node N2 of the light unit 11 at the tail end of the LED light string 10 is defined as the tail node B. Similarly, with reference to the embodiment of the LED light string 10 shown in FIG. 2B, the first nodes N1 of the light units 11, 11' at the head end of the LED light string 10 are connected to each other to be defined as the head node A. The second nodes N2 of the light units 11,11' at the tail end of the LED light string 10 are connected to each other to be defined as the tail node B.

The PWM controller 42 is configured to perform the foregoing PWM technique to output PWM control signal(s) for activating the foregoing switches SW1, SW2, SW3, SW4. FIG. 4 depicts an example of the PWM controller 42 that has a first PWM output 421 and a second PWM output 422. The PWM controller 42 outputs a first PWM control signal (hereinafter referred to as PWM1) via the first PWM output 421. The PWM controller 42 outputs a second PWM control signal (hereinafter referred to as PWM2) via the second PWM output 422. With reference to FIG. 3 and FIG. 4, the first PWM output 421 is electrically connected to the control input terminals of the first switch SW1 and the fourth switch SW4; and the second PWM output 422 is electrically connected to the control input terminals of the second switch SW2 and the third switch SW3.

Figure 5:
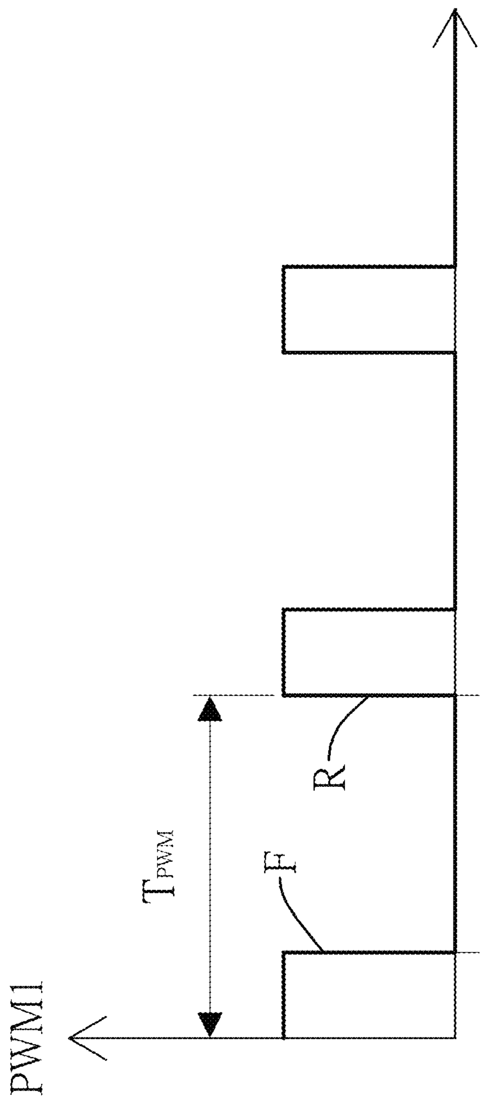
FIG. 5 is a schematic waveform diagram showing a PWM control signal (PWM1) provided on two switches of the control circuit of the full-spectrum decorative string light of the present invention.
Figure 6:
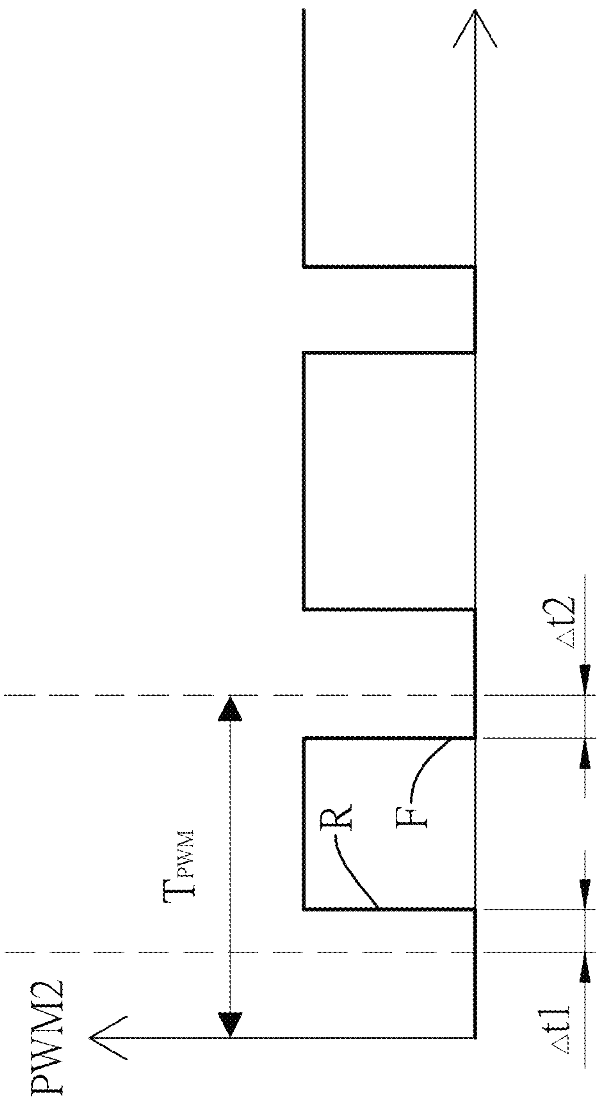
FIG. 6 is a schematic waveform diagram showing another PWM control signal (PWM2) provided on the other two switches of the control circuit of the full-spectrum decorative string light of the present invention.

With reference to FIG. 5 and FIG. 6, the signal diagram of PWM2 is inverse to the signal diagram of PWM1. So, when PWM1 is high, PWM2 is low; or when PWM1 is low, PWM2 is high. Besides, it is understandable that the signal of PWM may include a falling edge F and a rising edge R. In an embodiment of the present invention, the PWM controller 42 is programmed to create a first time gap Δt1 between the falling edge F of PWM1 and the rising edge R of PWM2, and create a second time gap Δt2 between the rising edge R of PWM1 and the falling edge F of PWM2. The PWM controller 42 may create the first time gap Δt1 and the second time gap Δt2 by delaying the rising edge R and/or advancing the falling edge F of PWM1 and PWM2. The example of FIG. 6 depicts that the rising edge R of PWM2 is delayed after the falling edge F of PWM1 for the first time gap Δt1; and the falling edge F of PWM2 is advanced before the rising edge R of PWM1 for the second time gap Δt2. For example, the first time gap Δt1 and the second time gap Δt2 may be between 0.1 and 100 milliseconds (including 0.1 and 100 milliseconds). Perfectly, the first time gap Δt1 and the second time gap Δt2 may be 40 milliseconds. The switches SW1, SW2, SW3, SW4 and the LED light string 10 will have better switching stability by the foregoing time gaps Δt1, Δt2.

The frequency of PWM1 and PWM2 may be between 500 and 10000 Hz (including 500 and 10000 Hz) preferably. With reference to FIG. 5 and FIG. 6, it is understandable that the foregoing frequency is the reciprocal of the time length "$T_{PWM}$" of PWM period (also known as the duration of one complete cycle) of PWM1 and PWM2; besides, the duty cycles of PWM1 and PWM2 are equal to or lower than 100% (≤100%), and equal to or higher than 0% (≥ 0%). It is understandable that PWM1 or PWM2 is a positive direct-current (DC) voltage while its duty cycle is 100%; in contrast, PWM1 or PWM2 may be 0V while its duty cycle is 0%.

The duty cycles of PWM1 and PWM2 are programmable and changeable between 100% and 0% (including 100% and 0%) by the PWM controller 42. Accordingly, the color temperature created by the LED light string 10 is dimmable between 2400K and 6500K (including 2400K and 6500K) based on the duty cycles of PWM1 and PWM2 generated by the control circuit to have the full-spectrum as described as follows.

For example, with reference to FIG. 2A, FIG. 2B, and FIG. 3, the first LEDs 111 in the LED light string 10 are yellow LEDs, and the second LEDs 112 in the LED light string 10 are white LEDs. When the duty cycle of PWM1 is 100% and meanwhile the duty cycle of PWM2 is 0%, the first switch SW1 and the fourth switch SW4 are normally turned on, and meanwhile the second switch SW2 and the third switch SW3 are normally turned off. Accordingly, the first LEDs 111 are normally turned on and meanwhile the second LEDs 112 are normally turned off. So, the LED light string 10 creates 2400K color temperature as a whole due to the shiny first LEDs 111 (yellow light).

In contrast, when the duty cycle of PWM1 is 0% and meanwhile the duty cycle of PWM2 is 100%, the first switch SW1 and the fourth switch SW4 are normally turned off, and meanwhile the second switch SW2 and the third switch SW3 are normally turned on. Accordingly, the first LEDs 111 are normally turned off and meanwhile the second LEDs 112 are normally turned on. So, the LED light string 10 creates 6500K color temperature as a whole due to the shiny second LEDs 112 (white light).

Besides, when the duty cycles of PWM1 and PWM2 are lower than 100% and higher than 0% as shown in FIG. 5 and FIG. 6, the first LEDs 111 and the second LEDs 112 are alternately turned on and off under a fast frequency, such that most people cannot observe the light flickering. So, the color temperature created by the LED light string 10 (mixed from the yellow light of the first LEDs 111 and the white light of the second LEDs 112) will be higher than 2400K and lower than 6500K.

As a result, the color temperature created by the LED light string 10 is dimmable between 2400K and 6500K (including 2400K and 6500K) based on the duty cycles of PWM1 and PWM2 generated by the control circuit to have the full-spectrum.

The PWM controller 42 is programmed to have multiple operation modes. For example, the operation modes may include a first mode, a second mode, and a third mode. When the PWM controller 42 performs the first mode, the PWM controller 42 sets the duty cycle of PWM1 as 100%, sets the duty cycle of PWM2 as 0%, and accordingly outputs PWM1 and PWM2. When the PWM controller 42 performs the second mode, the PWM controller 42 sets the duty cycle of PWM1 as 0%, sets the duty cycle of PWM2 as 100%, and accordingly outputs PWM1 and PWM2. When the PWM controller 42 performs the third mode, the PWM controller 42 steplessly and repeatedly changes the duty cycles of PWM1 and PWM2. For example, the duty cycle of PWM1 is repeatedly changed from 100% to 0% and to 100% (100%→0%→100% as a repeat loop); and PWM2 is inverse to PWM1 as mentioned above.

The PWM controller 42 may be programmed to define the sequence of the multiple operation modes. The PWM controller 42 may control the duty cycles of PWM1 and PWM2 according to a selected operation mode among the foregoing operation modes. With reference to FIG. 4, the PWM controller 42 is electrically connected to a mode switch 423. The mode switch 423 may be a tactile switch, a button switch, or a touch switch. When each time the PWM controller 42 determines the mode switch 423 is pressed down or touched by a user, the PWM controller 42 is switched to a next operation mode from a present operation mode. The switching for the multiple operation modes is repeatable. For example, the PWM controller 42 performs the first mode as a default mode at present. When the mode switch 423 is pressed down or touched, the PWM controller 42 is switched to the second mode. When the mode switch 423 is pressed down or touched again, the PWM controller 42 is switched to the third mode. Further, when the mode switch 423 is pressed down or touched again, the PWM controller 42 is switched to the first mode. So, the switching for the multiple operation modes is repeatable. The user can select one of the operation modes by pressing down or touching the mode switch 423 for multiple times.

Figure 7:
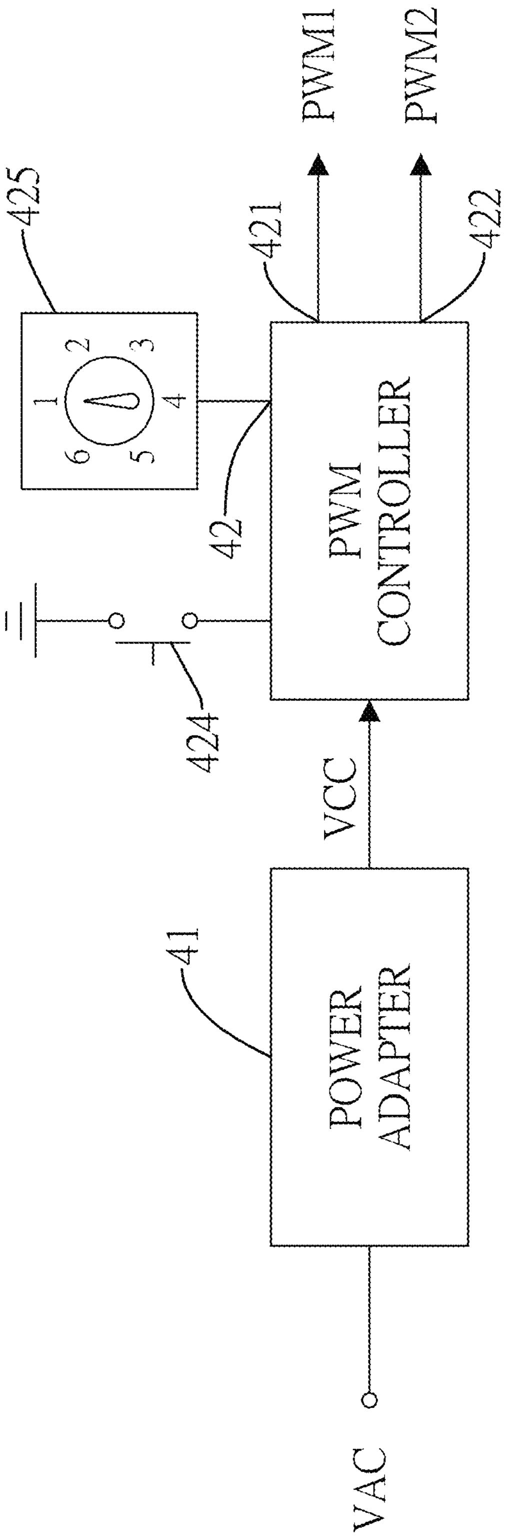
FIG. 7 is a schematic block diagram showing another embodiment of the control circuit of the full-spectrum decorative string light of the present invention.

In another embodiment, with reference to FIG. 7, the PWM controller 42 is electrically connected to a rotary switch 425 and a confirm switch 424. The rotary switch 425 has multiple selectable positions respectively corresponding to the operation modes of the PWM controller 42. The confirm switch 424 may be a tactile switch, a button switch, or a touch switch. In this embodiment, the operation modes include a dimmer mode. So, the rotary switch 425 would have a position (hereinafter referred to as a dimmer position) that corresponds to the dimmer mode. When the PWM controller 42 determines the rotary switch 425 is rotated to the dimmer position, the PWM controller 42 performs the dimmer mode accordingly to steplessly and repeatedly change the duty cycles of PWM1 and PWM2; besides, the PWM controller 42 determines whether the confirm switch 424 is pressed down or touched by the user while the duty cycles of PWM1 and PWM2 are still changing in the dimmer mode. For example, the duty cycle of PWM1 is repeatedly changed from 100% to 0% and to 100% (100%→0%→100% as a repeat loop); and PWM2 is inverse to PWM1 as mentioned above. The PWM controller 42 would stop the duty cycles of PWM1 and PWM2 changing and retain the present duty cycles of PWM1 and PWM2 when the confirm switch 424 is pressed down or touched. For example, when the present duty cycle of PWM1 is changed to 50% and meanwhile the confirm switch 424 is pressed down or touched, the PWM controller 42 would retain the duty cycle of PWM1 at 50%; and PWM2 is inverse to PWM1 as mentioned above. Hence, in the dimmer mode, the LED light string 10 will create a fixed color temperature after the confirm switch is pressed down or touched by the user, such that the user can set a desire color temperature created by the LED light string 10.

The user may use the LED light string 10 to decorate the Christmas tree, interior/exterior spaces, house eaves, and so on. The PWM controller 42 can activate the LED light string 10 to create the color temperature between 2400K and 6500K (including 2400K and 6500K). The PWM control to the LED light string 10 is exquisite. Most people will enjoy the view of the above-mentioned color temperature created by the present invention without eyestrain. In addition, the present invention would have advantages including low heat generation, low power consumption, simple circuit configuration, and high economic benefits.

What is claimed is:

1. A full-spectrum decorative string light comprising:

a light emitting diode (LED) light string including multiple light units; wherein each one of the light units has a first LED and a second LED, the first LED is electrically connected to the second LED in parallel by inverse direction, each one of the first LED and the second LED is selected from the group consisting of a yellow LED and a white LED, and the first LED and the second LED have different colors; and a control circuit electrically connected to the LED light string to activate the LED light string by pulse width modulation (PWM) control signals, wherein duty cycles of the PWM control signals are changeable, wherein a specification of the yellow LED includes 2400K color temperature, and a specification of the white LED includes 6500K color temperature.

2. The full-spectrum decorative string light as claimed in claim 1, wherein each one of the light units is a single LED bulb.

3. The full-spectrum decorative string light as claimed in claim 1, wherein in each light unit, a first node is between an anode of the first LED and a cathode of the second LED, and a second node is between a cathode of the first LED and an anode of the second LED; and for each two adjacent light units, the second node of one light unit is electrically connected to the first node of the other light unit to form a series connection.

4. The full-spectrum decorative string light as claimed in claim 3, wherein each light unit is further electrically connected to another light unit to form a parallel connection.

5. The full-spectrum decorative string light as claimed in claim 1, wherein the duty cycles of the PWM control signals are changeable between 100% and 0%.

6. The full-spectrum decorative string light as claimed in claim 5, wherein the PWM control signals include a first PWM control signal for activating the yellow LED, and a second PWM control signal for activating the white LED;

the second PWM control signal is inverse to the first PWM control signal;

when the duty cycle of the first PWM control signal is 100%, the yellow LED is normally turned;

when the duty cycle of the second PWM control signal is 100%, the white LED is normally turned on;

when the duty cycles of the first PWM control signal and the second PWM control signal are higher than 0% and lower than 100% respectively, the yellow LED and the white LED are alternately turned on.

7. The full-spectrum decorative string light as claimed in claim 6, wherein time gaps are programmed between a falling edge of the first PWM control signal and a rising edge of the second PWM control signal, and between a rising edge of the first PWM control signal and a falling edge of the second PWM control signal.

8. The full-spectrum decorative string light as claimed in claim 6, wherein:

the control circuit includes a PWM controller and a confirm switch electrically connected to the PWM controller;

the PWM controller steplessly and repeatedly changes the duty cycles of the first PWM control signal and the second PWM control signal;

the PWM controller stops the duty cycles of first PWM control signal and the second PWM control signal changing and retains present duty cycles of the first PWM control signal and the second PWM control signal when the confirm switch is pressed down or touched.

9. The full-spectrum decorative string light as claimed in claim 1, wherein frequencies of the PWM control signals are between 500 Hz and 10000 Hz.

* * * * *